United States Patent [19]

Buckland et al.

[11] Patent Number: 4,757,441
[45] Date of Patent: Jul. 12, 1988

[54] LOGICAL ARRANGEMENT FOR CONTROLLING USE OF DIFFERENT SYSTEM DISPLAYS BY MAIN PROESSOR AND COPROCESSOR

[75] Inventors: Patrick A. Buckland, Austin; John W. Irwin, Georgetown; Jack E. Reeder, Round Rock, all of Tex.

[73] Assignee: International Business Machines Corporation, Armonk, N.Y.

[21] Appl. No.: 68,769

[22] Filed: Jun. 29, 1987

Related U.S. Application Data

[63] Continuation of Ser. No. 706,803, Feb. 28, 1985, abandoned.

[51] Int. Cl.⁴ .................. G06F 13/10; G06F 15/16
[52] U.S. Cl. ..................... 364/200; 340/721; 340/717; 364/521
[58] Field of Search ........................... 371/19; 364/200 MS File, 900 MS File, 134, 521; 340/717, 721

[56] References Cited

U.S. PATENT DOCUMENTS

| | | | |
|---|---|---|---|
| 4,208,715 | 6/1980 | Kumahara | 364/200 |
| 4,363,104 | 12/1982 | Nussmeier | 364/200 |
| 4,396,978 | 8/1983 | Hammer | 364/200 |
| 4,454,593 | 6/1984 | Fleming et al. | 364/900 |
| 4,466,098 | 8/1984 | Southard | 371/9 |
| 4,475,237 | 10/1984 | Glasby | 371/67 |
| 4,480,314 | 10/1984 | McKelley | 364/900 |
| 4,547,849 | 10/1985 | Louie et al. | 364/200 |
| 4,550,386 | 10/1985 | Hirosawa et al. | 364/900 |
| 4,562,535 | 12/1985 | Vincent et al. | 364/200 |
| 4,571,671 | 2/1986 | Burns | 364/200 |
| 4,621,319 | 11/1986 | Braun et al. | 364/200 |

FOREIGN PATENT DOCUMENTS

| | | | |
|---|---|---|---|
| 56240 | 4/1980 | Japan | 340/717 |
| 72754 | 9/1981 | Japan | |
| 125161 | 7/1983 | Japan | 364/134 |

OTHER PUBLICATIONS

"Intelligent buffer reconciles fast processors and slow peripherals", *Electronics*, Sept. 11, 1980, Hillman, pp. 131–135.

*Primary Examiner*—Gary V. Harkcom
*Assistant Examiner*—Lawrence E. Anderson
*Attorney, Agent, or Firm*—Richard E. Cummins

[57] ABSTRACT

A method and system for controlling the display of data in a data processing system that includes a main processor, a memory subsystem, and an Input/Output subsystem which includes an I/O Channel Controller for managing traffic on an I/O bus having an attached co-processor and a plurality of I/O devices including display devices with different reserved I/O address space. The main processor can establish different display modes for displays having different reserved I/O address space, which generally indicates different display types. In one mode, a display is assigned exclusively to the main processor and attempted data transfers by the co-processor to that display are suppressed. The display control means is based on logic circuitry associated with the co-processor for trapping instructions having addresses within the range of those reserved for the display devices. The logic enables normal writes and reads to the video buffer to be suppressed or relocated to the virtual buffer, depending on the mode established by the main processor. A circular queue is established in memory to enable the main processor to selectively individually update the video buffer with the changes that have been made to the virtual buffer.

3 Claims, 3 Drawing Sheets

LOGICAL ARRANGEMENT FOR CONTROLLING USE OF DIFFERENT SYSTEM DISPLAYS BY MAIN PROESSOR AND COPROCESSOR

This is a continuation of application Ser. No. 706,803, filed Nov. 28, 1985, in the name of P. A. Buckland et al, entitled "LOGICAL ARRANGEMENT FOR CONTROLLING USE OF DIFFERENT SYSTEM DISPLAYS BY MAIN PROCESSOR AND CO-PROCESSOR", now abandoned.

TECHNICAL FIELD

This invention relates in general to data processing systems, and in particular, to a control arrangement and method which permits data that is being processed by the system's main processor and data being processed by the system's co-processor to be displayed individually or in a shared manner selectively on each of a plurality of different type display devices that are attached to the system.

BACKGROUND OF THE INVENTION

The prior art discloses a number of systems in which a co-processor is employed to assist the main processing unit to perform some of the more time consuming data processing tasks. In these systems it is not uncommon to have different types of display devices attached to the system, such as a monochrome display unit and an all-points addressable color display unit. Generally, each of the display units is selectively assignable to one of the processors by the operator at the time the system is brought on-line. Also in these systems, the applications that are being run by the system are generally based on programs that have been written for a multiprocessor-multidisplay system, so that whatever control and coordination of the displays that is required has been taken into consideration during the development of the program that is being run.

In co-pending application Ser. No. 706,804, now U.S. Pat. No. 4,703,420, filed concurrently herewith in the name of John Irwin, entitled "Bus Arbiter for a Data Processing System Having an Input/Output Channel," and assigned to the assignee of the present invention, a system is disclosed in which a co-processor is attachable to the input/output channel of a data processing system. Since the program that the co-processor executes is stored in the system's main memory, an I/O bus arbitrating scheme is employed which prevents the co-processor from monopolizing the I/O channel with instruction fetch requests to the main memory. The bus arbitrating scheme effectively allows the co-processor access to the input/output channel when none of the higher priority uses of the system are required and causes the co-processor to relinquish control of the bus in the presence of a request of a higher priority operator.

In a second co-pending application Ser. No. 706,802, now U.S. Pat. No. 4,695,945, also in the name of John Irwin and and entitled, "Processor I/O and Interrupt Filters," also assigned to the assignee of the present invention, an arrangement is disclosed which permits shared resources attached to the I/O bus of the system to be selectively assigned to either the main processor or the co-processor. The shared resources which are selectively assigned include the display devices, as well as other types of I/O devices.

Where an existing microprocessor, such as the INTEL 80286 is used as a co-processor in such a system, it would be desirable to be able to run programs that had originally been written for the IBM PC operating as a stand-alone system. In such an environment, the programs being run on the co-processor are referred to as uncontrolled programs, in that they have been written for an entirely different system configuration. These programs of unknown origin and internal protocols are unaware of the main processor and any sharing of resources that might occur on the input/output channel bus. Since these prior programs may call for the data being processed by the co-processor to be displayed on any one of three different display type devices that are normally attachable to the IBM PC, the new environment must be able to handle several different situations for displaying data. Each display type has been assigned by the architecture of the IBM PC system to a different range of addresses. The new environment, therefore, accommodates several different situations that could arise involving display types on the system and display types called for by the programs being run by the co-processor. Each display type consists of a CRT display head driven by a hardware adapter which has a memory mapped video buffer at a predefined address range and I/O mapped control register at a predefined address range. For example, the new environment must accommodate the assignment of a single display to the main processor and a different display to the co-processor. It must also prevent the co-processor from writing data to a display owned by the main processor.

In addition to providing the conventional functions for displaying in the system, the availability of a second processor in the system provides additional functions for enhancing the overall display capability of the system. For example, in many applications it would be desirable from the operator's standpoint to be able to display data being processed by either the main processor or the co-processor selectively on one display device merely by toggling a key on the keyboard. Such an arrangement permits the operator to run two unrelated applications in parallel and check on the progress of each.

It would also be advantageous in some applications to be able to "window" data being processed by the co-processor onto the data being displayed by the main processor so that the operator could view both applications simultaneously without interrupting the operation of either program.

Lastly, it would be desirable to be able to run a program that was written to support one type of display device and have it operable on another type of display device where the picture element (PEL) densities are substantially different.

This feature of the invention permits the attachment of display devices developed in the future having higher resolutions to be employed in the present system even though the program code being run is not based on an enhanced display device.

The enhanced display functions described above are provided for with the present invention for a data processing system including a main processor and a co-processor, with very little additional circuitry and with little or no impact on system performance.

SUMMARY OF INVENTION

In accordance with the present invention, the co-processor shares the displays attached to the system in several different modes in a manner transparent to the operator and to the program code that is being run by the co-processor. In the situation where the displays attached to the system have been pre-assigned to either the processor or the co-processor, the invention merely prevents the program being run on the co-processor from inadvertently destroying data on a display assigned to the main processor.

In a second situation, one display is being time shared by both processors, with the operator being able to select which data gets displayed by means of a predefined key on the keyboard which toggles from one set of data to the other. The data not being displayed is nevertheless updated in a virtual buffer by its processor so that the display can be returned to its proper state when the display is re-assigned. The data in the real buffer and virtual buffer is swapped when ownership changes.

In the third situation, the data from the co-processor is mapped into a window on the display assigned to the main processor. The mapping function performed by the main processor may reflect a pel resolution of the display that is different than the pel resolution of the display for which the code had originally been developed.

Lastly, data processed by the co-processor can be displayed on the display dedicated to the co-processor, even when the pel density and control protocol are completely different from those parameters supported by the original code.

The invention comprises a set of logic circuits disposed between the I/O channel of the system and the co-processor, which function to trap selected I/O mapped control signals from the co-processor to the displays attached to the system. A first group of logic circuits functions to suppress write signals to a display device which is not owned exclusively by the co-processor. This action prevents control signals and data from being sent to the control mechanism of the video buffer for that display which would destroy the data being processed and displayed by the main processor.

Where the new environment permits a display to be time-shared between the main processor and the co-processor, a virtual video buffer is established in main memory for each of the displays attached to the system. When data is not being displayed, changes are made in the virtual video buffer. When ownership of the display changes, the contents of the real and video buffers are swapped. In addition, a second set of trap logic must trap and record changes to the write only registers of the display control mechanism, even though the co-processor owns the display, so that it can be properly set up when control is returned from the main processor. The main processor, after copying the control information for later use, must also provide the response to the co-processor required by the system protocols.

When the new environment permits the data being processed by the co-processor to be displayed on a device owned by the main processor, in a "windowing" context, the logic circuitry must also trap all I/O mapped control changes to the display. These changes are stored so that the required action of the changes can be emulated by the main processor.

The invention further includes suitable control means for selective relocation of read and writes to the video buffer address range to a like area of the memory mapped virtual display buffer. This selective relocation is achieved in a manner which is transparent to the operator and to the code being run by the co-processor.

As control of the display changes, the memory mapped virtual buffer is swapped for the real buffer. The relocation function of the co-processor is disabled when the display is being time-shared by the main processor and co-processor, and control is given to the co-processor since the co-processor can write directly to the real video buffer.

When the data from the co-processor is being windowed on the display or if the display dedicated to the co-processor is not pel compatible with the code being processed by the co-processor, it is necessary to relocate all reads and writes to the real video buffer, to the virtual video buffer in main memory.

The main processor controls the set of logic circuits in accordance with the desired operation by setting a control register associated with the set of logic. The control either (1) assigns a display to the co-processor; (2) suppresses transfer to a display owned by the main processor; or (3) activates the relocation function and establishes a virtual buffer in main memory.

When the relocation function is active, an interrupt can be generated under control of the program of the main processor for each write to the virtual buffer. This allows the main processor to determine by various algorithms when the display should be updated. The interrupt does not stop the operation of the co-processor.

Lastly, where data from the co-processor is being sent to the virtual display buffer, either to be windowed on the display or to be pel converted, it is not very efficient for the main processor to process each change as it occurs. For example, in the "windowing" situation, the change may be to data that is not in the window. In the pel conversion situation, the fact that something has changed does not help the update process and it is not practical to find what picture element has been changed by a comparison process or to refresh the entire buffer as a change is detected. Therefore, the system further includes a circular queue in main memory for each display device which functions to maintain a list of video buffer addresses that have been involved in a change. The size of the queue is set by the main processor under program control. The main processor can also determine what position is currently being serviced and what is the current size of the queue. The queue is serviced by the main processor so that as changes are made to the virtual buffer, they are discarded from the queue. If the queue has become full, then the co-processor stops until additional space in the queue is provided by either enlarging the size of the queue or processing the items in the queue, or providing space for a second queue.

It is therefore an object of the present invention to provide an improved arrangement for permitting different data processing units attached to the same system to share display units attached to the system.

Another object of the present invention is to provide an arrangement for controlling the use of different type display devices by two processing units attached to the same system.

A further object of the present invention is to provide an improved arrangement for preventing data being displayed on a display unit under the control of a main processor from being adversely affected by code of an unknown origin and internal protocol being run by a co-processor attached to the same system.

A still further object of the present invention is to provide an improved arrangement which permits a display device to be time-shared for selectively displaying data processed by either the main processor or co-processor of the system.

A still further object of the present invention is to provide an improved arrangement for "windowing" data being processed by a co-processor on a display unit displaying data being processed by the main system processor.

A still further object of the present invention is to provide an improved arrangement for displaying data from a co-processor on a display unit which has display parameters and specifications that are not pel compatible with the data being processed by the co-processor.

Objects and advantages other than those mentioned above will become apparent from the following description of the preferred embodiment of the invention when read in connection with the drawings.

DESCRIPTION OF THE PREFERRED EMBODIMENT

Figure 1:
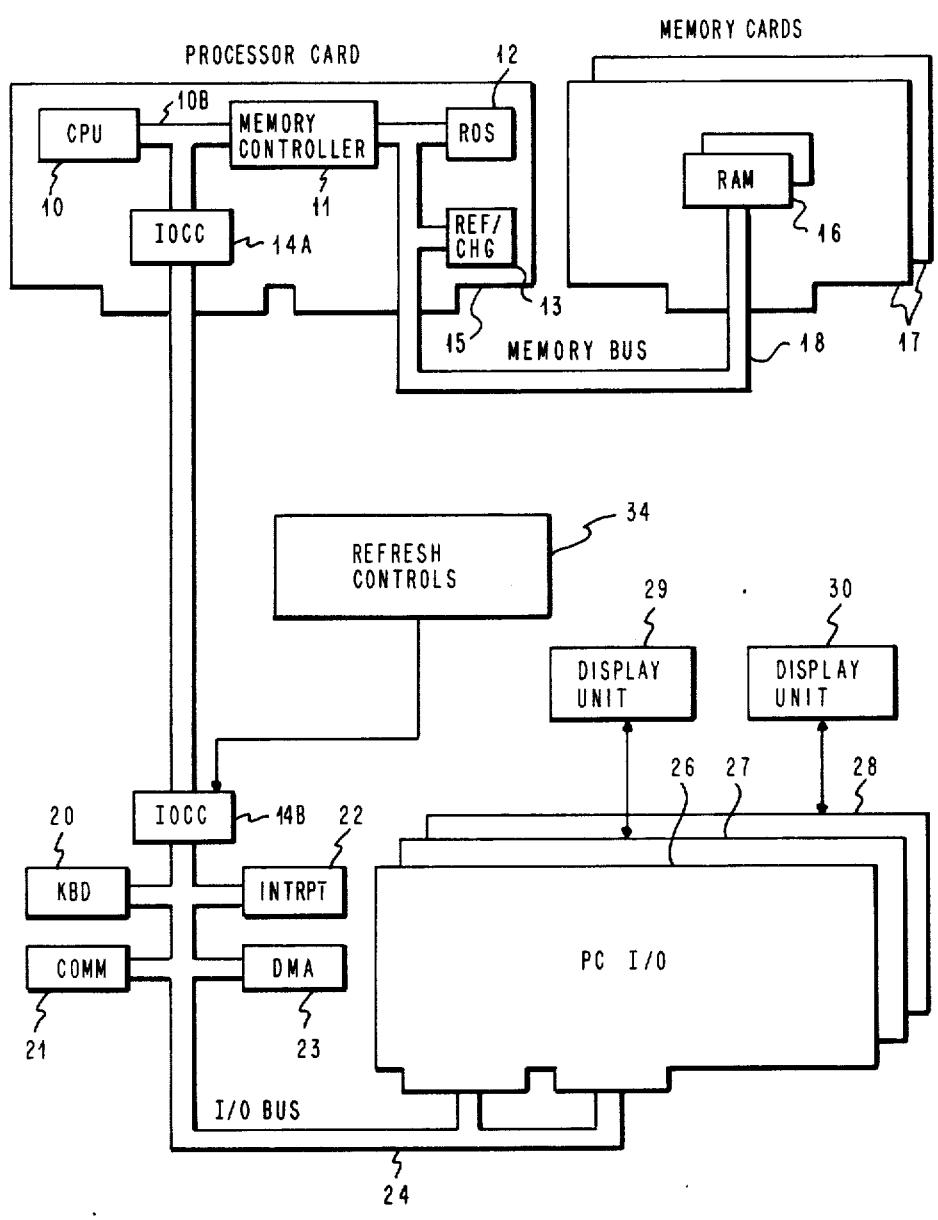
FIG. 1 is a block diagram of a data processing system embodying the present invention.

FIG. 1 illustrates in block diagram, a data processing system embodying the present invention. As shown, the system comprises a main Central Processing Unit 10 or main processor, a memory controller 11, a Read Only Storage block 12, a reference and charge block 13, and a portion of an Input/Output Channel Controller (IOCC) 14a. The functional blocks are depicted as being mounted on a printed circuit card 15, referred to as the processor card. The processor card is arranged to be inserted in a pair of sockets on a mother board which contains sockets for other cards, functional modules, such as the refresh controls 34, the interrupt controller 22, the Direct Memory Access controller 23, a communications controller 21, and a keyboard controller 20. The mother board also mounts the other portion 14b of the Input/Output Channel Controller function in addition to being provided with a number of multi-conductor busses which carry signals throughout the system.

The two main busses shown in FIG. 1 are the I/O bus 24 and the memory bus 18 which extend from the memory controller 11 on the processor card 15 to the RAM memory 16 on memory card 17.

The system shown in FIG. 1 further includes three additional cards, 26, 27, and 28 which are plugged into the mother board and are attachable to the I/O bus 24.

Card 26 is designated as the co-processor card and includes the second processing unit in the system which is referred to as the co-processor. Co-processor card 26 may be assumed to be functionally equivalent to the IBM PC/XT microprocessor. Cards 27 and 28 are display adapter cards whose primary function is to act as a conventional video buffer for displays 29 and 30 respectively. It should be assumed that a reference in this description to a display or display unit encompasses both the tube, that is, the screen, and the associated electronics included with the video buffer to achieve the display function. The additional electronics provided on the adapter card includes a display controller which includes a number of registers for controlling various display parameters, such as the particular mode, i.e., graphic or character, the number of pels in the display, the refresh rate of the display, etc., all of which are standard controls for display devices. It will be assumed, for purposes of description, that display 29 is the conventional green phosphored monochrome display that is attachable to the IBM PC family. It may further be assumed that display 30 is the IBM all-points addressable color monitor that is also attachable to the IBM PC system family.

Figure 2:
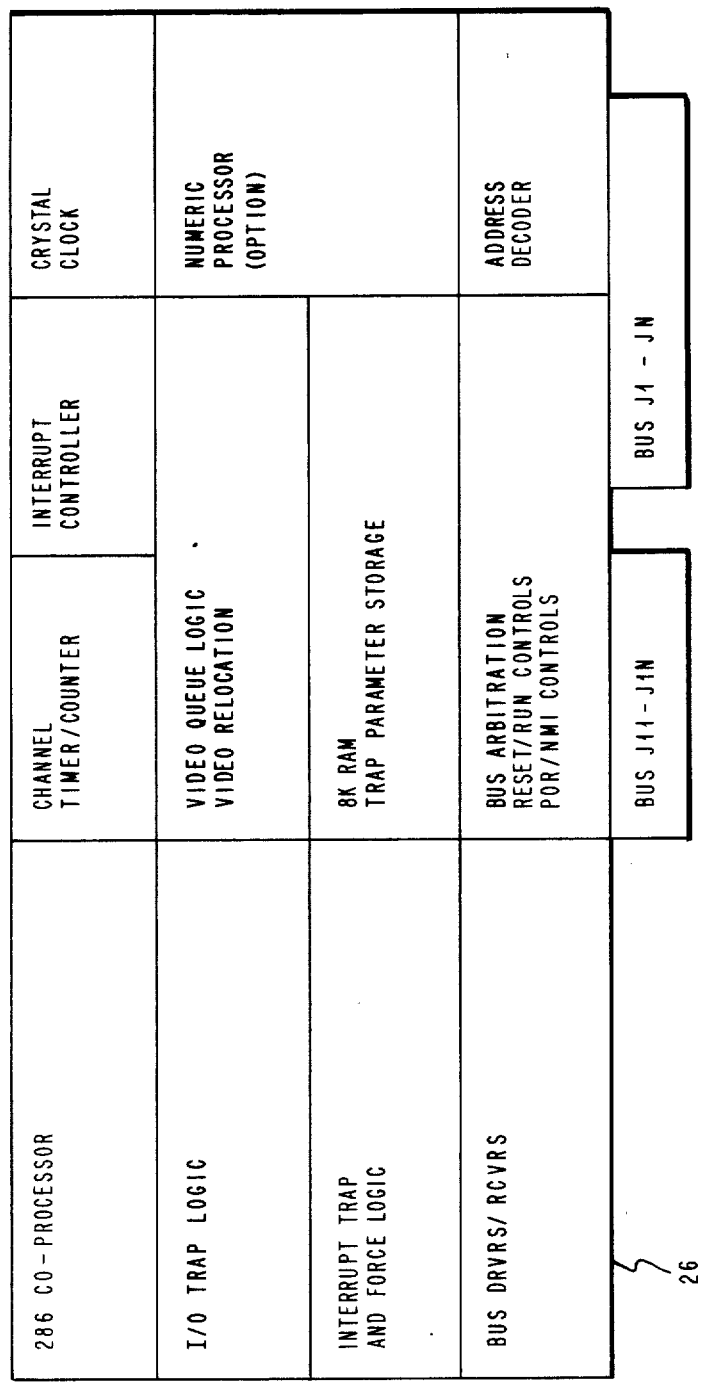
FIG. 2 is a diagrammatic representation of the co-processor card shown in FIG. 1.

FIG. 2 illustrates the various functional modules that are packaged on the co-processor card in addition to the main co-processor module 31. The co-processor is provided with a crystal oscillator 32 driving a state-of-the-art clock module to provide all of the timing functions for the co-processor. The co-processor generally runs asynchronously relative to the I/O bus 24 except when it has control of the bus. During such periods, the co-processor provides all data and control signals in synchronism with the bus clock.

The bus arbiter/reset run controls 33 are also packaged on the co-processor card and function as described in the previously cross referenced co-pending application (U.S. Pat. No. 4,703,420) in arbitrating use of the I/O bus 24 by the co-processor 31 and the other I/O devices that are attached to the I/O bus. The card further includes a conventional address decoder 33a and the bus drivers and receivers 34, in addition to an interrupt controller 35. A numerical processor module 36 may also be accommodated on the co-processor card 26.

The remaining functions illustrated on the co-processor card, namely the I/O trap logic 37, the interrupt trap and force logic 38, the video queue logic and relocate function 39, and the trap parameter storage 40 are all provided in connection with the preferred embodiment of the present invention.

It will be recognized by persons skilled in the art that the provision in a system having two processors and two displays requires a degree of control and coordination to ensure that the applications being run on each processor do not interfere with each other's system display of data. It should be remembered that since both displays are accessible through the I/O bus, data in the video buffer can be accessed by either CPU if the programs being run permit or employ the same display addresses. In other words, the display does not know which processor is involved in the transfer of a byte of data from memory to the video buffer. Most arrangements, therefore, merely coordinate the programs being run by each processor and assign a given display to a specific processor to the exclusion of the other processor. While such an arrangement is satisfactory in many applications, it overlooks the potential that is available for displaying data in the system. By the addition of a relatively simple logical arrangement that is under control of the main processor, and that functions to trap an instruction being executed by the co-processor involving one of the display devices connected to the system, a variety of display modes are made possible, some of which provide capabilities not heretofore obtainable.

The simplest mode in which the system operates is used when a given display 29 for example is dedicated to the main processor 10 and the programs being run by the co-processor 31 are of unknown origin and protocol. This environment raises the potential of the co-processor 31 transferring data to the video buffer of the display 29 owned by the main processor and thus, destroying displayed information. In this mode the actual transfer of data is suppressed and if the protocol requires a response from the device it is emulated by the main processor to the co-processor.

The second mode available for displaying data in the system involves the co-processor 31 and processor 10 time-sharing one display. In this mode a virtual video buffer is set up in main memory 16, corresponding to the real video buffer, and relocation logic effectively changes the address for the video buffer write instruction from the real video buffer address to the virtual video buffer in main memory 16. When the co-processor 31 owns the display in this time-sharing mode, control changes to the write only control registers associated with the display electronics on cards 27 or 28 must also be recorded by the main processor, so that when control is returned to the co-processor 31, the display can be properly initialized and placed in a condition that existed at the time ownership was transferred to the main processor 10.

The ability of the system to establish a virtual video buffer allows two further enhanced display functions. The first permits co-processor data transferred to the virtual video buffer to be "windowed" onto the display screen with data from the real video buffer. The specifics of the "windowing" arrangement are under the control of the main processor 10 and function similarly to other "windowing" arrangements. Their details are therefore not described in this specification. The second enhanced function involves permitting co-processor data to be displayed on a display device having display characteristics, such as pel resolution, that are not supported by the program being run. The main processor 10 reads the co-processor data stored in the virtual video buffer and transfers it to the real video buffer of the display associated with the co-processor after putting that data in the proper format.

In the later two modes of operation involving first writing to the virtual video buffer and then reading from the video buffer, a circular queue arrangement is established in memory 16 for recording the specific address in the virtual video buffer that has been changed. The circular queue is managed by the main processor 10 in a conventional manner. The length or size of the queue can be set under control of the main processor 10 and, as the real video buffer is updated from the virtual video buffer, the queue limit pointer is moved to the next address.

Figure 3:
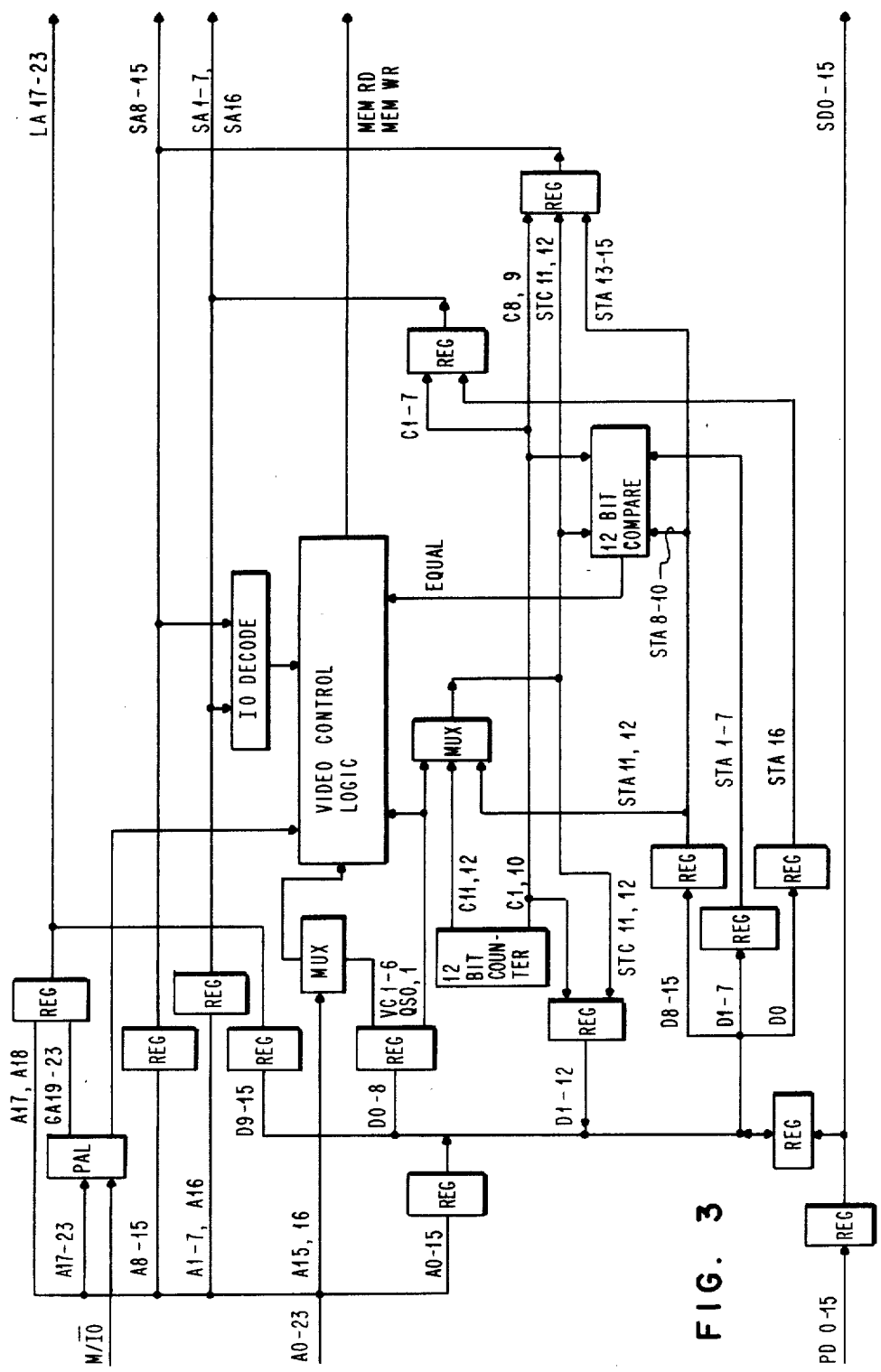
FIG. 3 is a detailed diagram of the trap logic circuitry shown associated with the co-processor in FIG. 1 for selectively trapping read and write control signals directed to the real video buffers of the system display units.

FIG. 3 illustrates the details of the functional blocks 37, 38, and 39 on FIG. 2 which implement the above-described functions.

In general, FIG. 3 represents circuitry that is disposed between the output of the co-processor 31 represented by address lines A0-23 Processor Data lines PD0-15 and a line labeled Memory I/O (not I/O), all of which are connected to a number of multi-stage registers which latch the respective signals on these lines for further processing. The circuits shown in FIG. 3 is one implementation of the various functions which have been discussed in connection with the four possible modes of the display system.

It will be recalled that the IBM PC architecture reserves 128k bytes of address space for video buffers associated with the display devices. This space has been further divided into one 64k buffer and two 32k buffers. The 64k buffer is assigned an address space designated by a hexadecimal address "A0000" and is reserved for the advanced display device. The first 32k buffer is for the IBM monochrome display and is assigned address space "B0000"-"B7FFF" while the second 32k buffer at address space "B8000"-"B8FFF" is reserved for the PC color display.

When the co-processor 31 executes an instruction intended to update the video display buffer, it is in effect transferring data to the address specified on address lines A0-23. By examining certain positions of this address bus when a memory write instruction is being executed, the circuitry of FIG. 3 can determine if the instruction involves a transfer to one of the display buffers. If the instruction does involve such a transfer, then the logic responds in accordance with the initial mode assignments made by the main processor. The mode assignment involves a one byte transfer from the main processor 10 through the I/O bus data line to an eight stage register 44 in FIG. 3.

Video control register 44 of eight stages has, in effect, four two bit fields, the first three of which are assigned respectively to control the three different display types which may be connected to the I/O bus 24. Each of the first three fields can represent one of four different previously defined modes for the associated display as follows:

00 The display is assigned to the co-processor
01 Suppress transfer of any data to the display by the co-processor
10 Relocate the data to the virtual buffer
11 Relocate the data and list the buffer address involved in the transfer in the circular queue The fourth two-bit field is employed to set the size of the circular queue to 1k, 2k, or 4k elements.

It should be understood that where the display has been assigned to the co-processor by the 00 condition of the two-bit control field or has been set to suppress the transfer condition by the 01 mode setting, there is no need for a virtual video buffer since in the first case, data transfers are made direct to the real buffer and in the second case, they are suppressed.

After register 44 has been set up by the data of the control byte from the main processor, bits 15 and 16 of the address on line 46 involved in the instruction currently being executed, along with the state of the video select line 60 from the programmed array logic block 53, initiates operation of the video control logic 50 which, for the initial two modes being discussed, results in either no action or the memory read-write control lines 61 being suppressed so that no transfer occurs.

The relocate function which is involved selectively in the time-sharing mode and continuously in the last two modes, is also implemented by the circuits of FIG. 3. This function of relocation involves the replacing the high order bits 17-23 of the 24 bit address supplied from the co-processor which normally addresses the real video buffer, with high order bits to address the virtual buffer in main memory. In FIG. 3, address bits SA1-7, 8-15 and 16 are supplied from the co-processor address line 41 through registers 70 and 71. The relocated address, that is the seven high order bits LA17-83 for the relocated address, is supplied from register 43 which was loaded from the main processor 10 when register 44 was loaded with the mode control bits. Thus, the data that would normally have been written to the real video buffer is written in the virtual video buffer at the address supplied from register 43 on the line designated LA17-23 which forms the high order address for the virtual video buffer in main memory 16.

The two remaining functions that are implemented in the circuitry of FIG. 3 relate to the management of the circular queue and the listing of addresses in the queue which reflect the changes in the virtual buffer which have not as yet been transferred to the real video buffer by the main processor 10. It will be recalled that the queue operation is only required for the modes where data from the co-processor 31 is being "windowed" or the code being run by the co-processor 31 is for a display type that is not available to the co-processor.

The circuitry of FIG. 3 involved in the queue function includes the counter 80, the multiplexor 81, the 12 bit comparator 82, and the queue limit registers, 83 and 84 and the tri-state buffer 85. The queue is located in the same 128k area in memory as the virtual video buffers for each display. The size of the queue is set by the control bytes supplied to register 44 from the main processor. The counter 80 can be reset to 0 by the main processor 10 which can also read the current status of the counter through buffer 85 and load the queue limit registers 83 and 84 with the address of the newly established end of the queue.

When the queue size has been set to 1k (1024 addresses), the counter 80 employs 10 bits to define the current queue address. The counter is advanced one count for each instruction processed by the co-processor that involves a relocatable write to the virtual buffer. The counter can be considered a pointer to the address of the next entry in the queue that is to be written by the co-processor 31. The information stored at the previous queue address is the buffer address of a byte in the virtual buffer that was updated as a result of the relocated write operation. If the main processor 10 does not read the virtual buffer and update the real buffer fast enough, the queue becomes full which is indicated by the comparator raising the equal line showing that the contents of the counter and the queue limit register are equal. When this occurs, any attempt by the co-processor to write to the virtual buffer will stop the coprocessor until queue space is provided. Queue space may be provided by servicing the queue or by changing the queue address to another address in main memory.

The main processor maintains a counter containing the address of the queue location to be read. It is set to 0 at the same time the queue counter is set to 0. The difference between the contents of the main processor counter and the queue counter represents the number of items in the queue that have to be serviced.

The queue addresses are developed in registers in 90 and 91 in FIG. 3 and will reflect either the contents of the counter 80 or the queue limit registers 83 and 84 and also the size of the queue, as previously established.

The data that is written at the queue address, namely the virtual buffer address that was changed, is developed in FIG. 3 on bus lines SD0-15 from the address lines 41 through register 98 and transceiver 99. The management of the read operation of the virtual buffer in the preferred embodiment is based on the concept of allowing the main processor to be selectively interrupted by an interrupt request signal developed by the co-processor 31 when a relocate write to the virtual buffer is performed. Servicing of this interrupt by the main processor 10 involves reading the buffer address information stored at the queue address specified by the queue counter 80 and buffer 85, and updating the real buffer with a byte of data from the virtual buffer. If another interrupt is pending after the first interrupt is serviced, then the pending interrupt is serviced before returning control of the I/O bus to the system.

The video control logic 50 on the co-processor card 26 includes 2 interrupt control register bits (not shown) which are setable from the main processor. One bit controls interrupts on control buffer display writes and the other bit controls interrupts in sensing a queue full condition. Since changes to the display tend to come in batches, the main processor is programmed to adapt its mode of operation to either an interrupt driven mode or a polling mode. The main processor is generally in the interrupt driven mode, waiting for the co-processor interrupt that indicates a relocatable write has occurred to the virtual buffer. If an interrupt is sensed, the main processor 10 rewrites the interrupt control bit in the interrupt control register of the co-processor so that it is no longer interrupted on relocatable writes to the virtual buffer. The processor 10 then periodically polls the status of the queue and services the pending changes that have been made in the virtual buffer. The main processor 10 keeps its mode of operation in the polling mode until a number of polls indicate that no changes have occurred to the virtual buffer, which is indicated by the status of the counter remaining fixed. When such a condition is sensed by the main processor 10, its mode is switched back to an interrupt driven mode by rewriting the interrupt control bit of the interrupt control register of the co-processor.

If the co-processor queue activity is very rapid, then the co-processor will cause a queue full interrupt. The processor has the ability to decide then, merely to update the entire video buffer from the virtual video buffer, rather than process the individual changes listed in the queue. Such an operation usually occurs when the co-processor has requested that the screen of the display device be cleared.

The present invention thus provides enhanced display capabilities with a minimum of additional circuitry and with little or no impact on system performance.

While the invention has been particularly shown and described with reference to the preferred embodiment thereof, it will be understood by those persons skilled in the art that various changes in the form and detail may be made without departing from the scope and spirit of the invention.

What is claimed is:

1. A display method for use in an interactive data processing system having, a main processor unit, a common memory subsystem connected to said main processor unit, and an Input/Output (I/O) subsystem connected in data transferring relationship with said main processor unit and said common memory subsystem, said I/O subsystem including an I/O bus, an I/O Channel Controller (IOCC), a coprocessor unit, and first and second display devices each having a video buffer with a different preassigned address range, said coprocessor unit and said display devices being selectively connectable in data transferring relationships to said common memory subsystem through said I/O bus and said I/O Channel Controller, to permit a first program stored in said common memory system which has an unknown display protocol to be run on said coprocessor unit concurrently with another program on said main processor without interfering with data to be displayed on said first display device from said first program, said method comprising the steps of;

(a) storing said programs in said common memory subsystem, said other program having been written to normally display data on said first display device, then (b) establishing a display mode with mode control circuitry connected to said coprocessor unit in which data from said first program is displayed on said second display device when said first program is run on said coprocessor unit including the substeps of, (1) interactively entering information into said system to cause said main processor unit to send a first mode control signal to said mode control circuitry, (2) establishing said first display mode in response to said first mode control signal, then (3) activating trap logic circuitry connected to said coprocessor to identify an instruction to be executed by said coprocessor having a destination address within the address range assigned to said first display device, (c) running said first program on said coprocessor unit, and then (d) transferring data to be displayed by said first program to said second display device provided the destination address of the instruction is within the range assigned to said second device, and blocking said transfer when said destination address is within the address range of said first display device whereby a first program of unknown display protocol may be run on said coprocessor concurrently with another program on said main processor without interfering with said first display device.

2. The method recited in claim 1 in which said mode control circuitry has a mode control register having an output connected to said coprocessor unit, and said step of establishing a first display mode further includes transferring a mode control command from said main processor unit to said register to enable said circuitry to identify subsequent data transfers by said coprocessor from said common memory subsystem to said display devices.

3. The method recited in claim 2 in which said step of blocking said transfer includes the step of disabling the control lines of said common memory subsystem to prevent data from being read from said memory.

* * * * *